US010528543B2

(12) United States Patent
Ogata et al.

(10) Patent No.: US 10,528,543 B2
(45) Date of Patent: *Jan. 7, 2020

(54) INFORMATION PROVIDING APPARATUS AND INFORMATION PROVIDING SYSTEM

(71) Applicant: FUJI XEROX CO., LTD., Tokyo (JP)

(72) Inventors: Naoya Ogata, Kanagawa (JP);
Masatoshi Maruo, Kanagawa (JP);
Hideki Fujimoto, Kanagawa (JP);
Mariko Miyazaki, Kanagawa (JP);
Hajime Kajiyama, Kanagawa (JP);
Akira Ichikawa, Kanagawa (JP);
Tetsuya Kobayashi, Kanagawa (JP);
Toshihiko Shibusawa, Kanagawa (JP);
Kunitoshi Yamamoto, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/201,427

(22) Filed: Nov. 27, 2018

(65) Prior Publication Data

US 2019/0146964 A1    May 16, 2019

Related U.S. Application Data

(63) Continuation of application No. 15/692,577, filed on Aug. 31, 2017, now Pat. No. 10,169,340.

(30) Foreign Application Priority Data

Mar. 14, 2017   (JP) .................................. 2017-048195

(51) Int. Cl.
*G06K 15/00*     (2006.01)
*G06F 16/23*    (2019.01)
(Continued)

(52) U.S. Cl.
CPC .......... *G06F 16/23* (2019.01); *G05B 19/0423* (2013.01); *G06Q 10/10* (2013.01); *G06Q 30/0269* (2013.01); *G05B 15/02* (2013.01)

(58) Field of Classification Search
CPC ....... G06F 17/00; G06F 17/30; G05B 19/042; G05B 15/02
(Continued)

(56) References Cited

U.S. PATENT DOCUMENTS 9,020,679 B2   4/2015  Zini et al.
9,160,783 B2  10/2015  Pinter
(Continued)

FOREIGN PATENT DOCUMENTS

JP    2003-050559 A    2/2003
JP    2004-302328 A   10/2004
(Continued)

*Primary Examiner* — Karl D Frech
(74) *Attorney, Agent, or Firm* — Oliff PLC

(57) ABSTRACT

An information providing apparatus includes a moving unit, an obtaining unit, and a presenting unit. The moving unit causes the information providing apparatus to move toward a specified destination or along a predetermined route. The obtaining unit obtains information associated with a user located around a current position of the information providing apparatus in accordance with moving of the moving unit. The presenting unit presents the information obtained by the obtaining unit.

8 Claims, 9 Drawing Sheets

(51) Int. Cl.
  *G05B 19/042* (2006.01)
  *G06Q 10/10* (2012.01)
  *G06Q 30/02* (2012.01)
  *G05B 15/02* (2006.01)
(58) Field of Classification Search
  USPC .................................... 235/383, 375, 380
  See application file for complete search history.

(56) References Cited

U.S. PATENT DOCUMENTS 10,169,340 B2 * 1/2019 Ogata ................ G05B 19/0423
2007/0061041 A1 3/2007 Zweig

FOREIGN PATENT DOCUMENTS

JP   2005-172879 A   6/2005
JP   2008-015703 A   1/2008

* cited by examiner

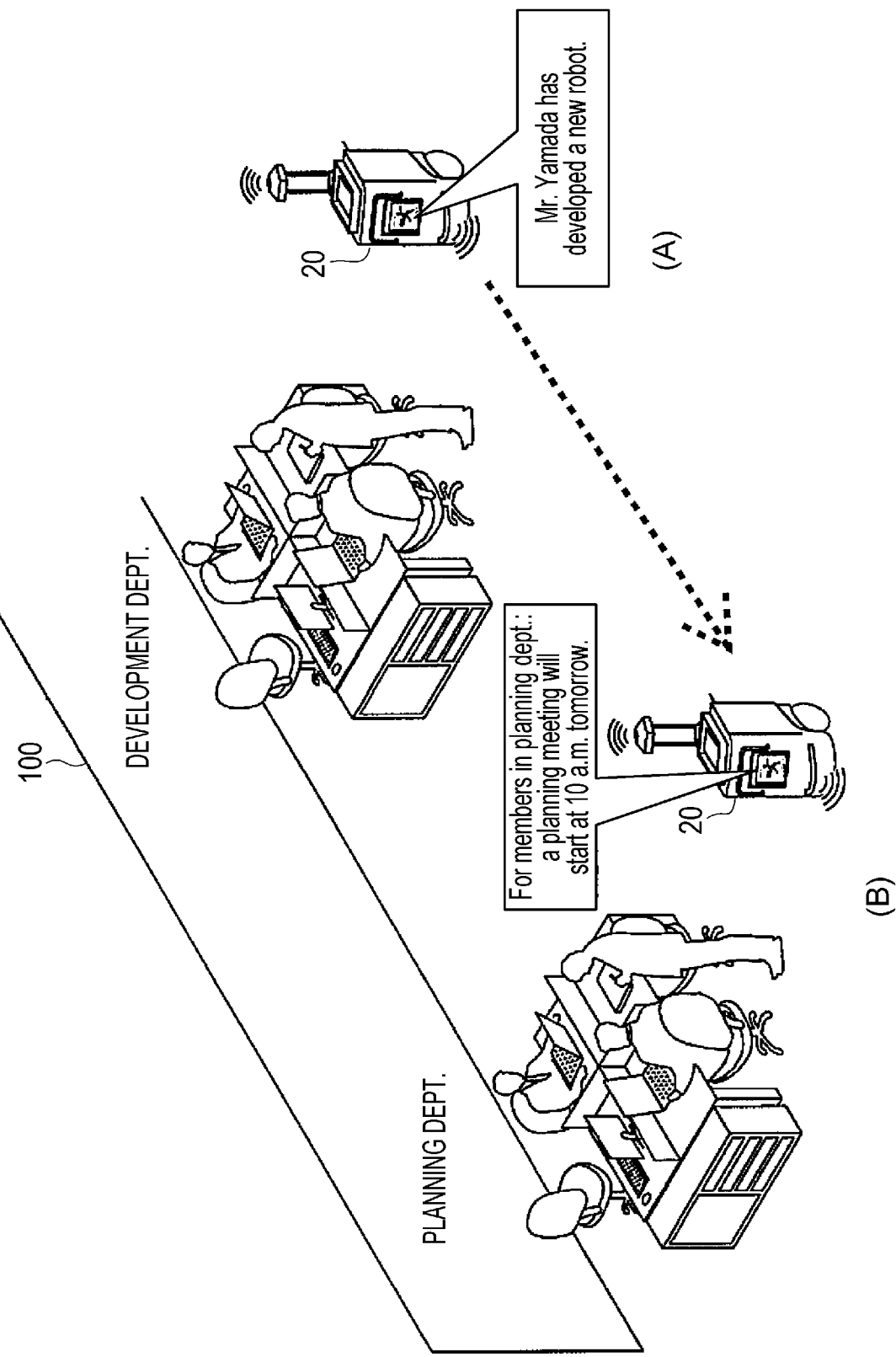

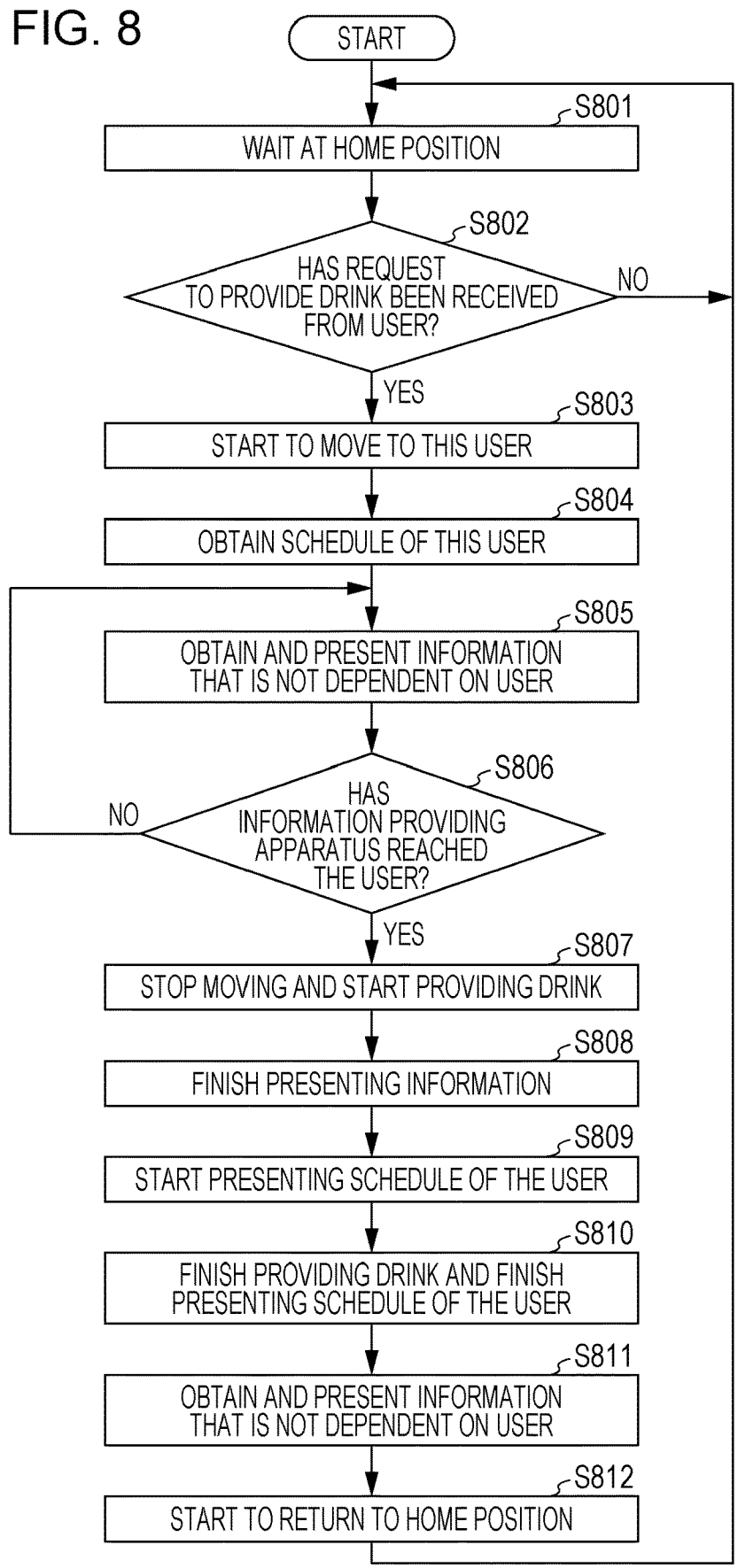

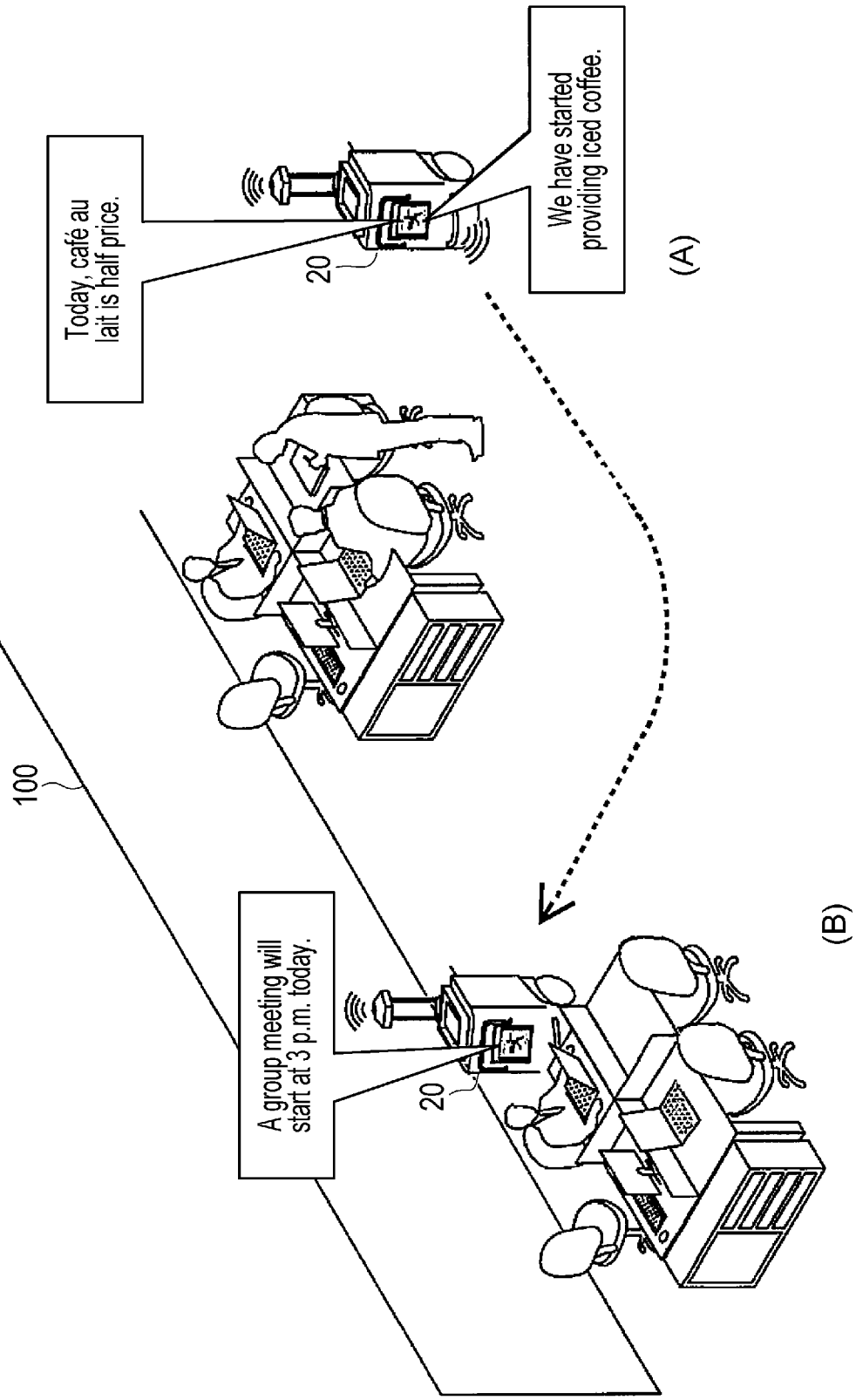

INFORMATION PROVIDING APPARATUS AND INFORMATION PROVIDING SYSTEM

CROSS-REFERENCE TO RELATED APPLICATIONS

This application is a continuation application of U.S. patent application Ser. No. 15/692,577 filed on Aug. 31, 2017, which is based on and claims priority under 35 USC 119 from Japanese Patent Application No. 2017-048195 filed Mar. 14, 2017. The disclosures of each of the above are hereby incorporated by reference in their entireties.

BACKGROUND

Technical Field

The present invention relates to an information providing apparatus and an information providing system.

SUMMARY

According to an aspect of the invention, there is provided an information providing apparatus including a moving unit, an obtaining unit, and a presenting unit. The moving unit causes the information providing apparatus to move toward a specified destination or along a predetermined route. The obtaining unit obtains information associated with a user located around a current position of the information providing apparatus in accordance with moving of the moving unit. The presenting unit presents the information obtained by the obtaining unit.

BRIEF DESCRIPTION OF THE DRAWINGS

An exemplary embodiment of the present invention will be described in detail based on the following figures, wherein:

FIG. 7 illustrates a state of the self-mobile information providing apparatus when passing by a development department and that when passing by a planning department;

FIG. 8 is a flowchart illustrating another example of information providing processing executed by the information providing system according to the exemplary embodiment; and FIG. 9 illustrates a state of the self-mobile information providing apparatus while moving toward a user made a request and that when the self-mobile information providing apparatus has reached the user.

DETAILED DESCRIPTION

Figure 1:
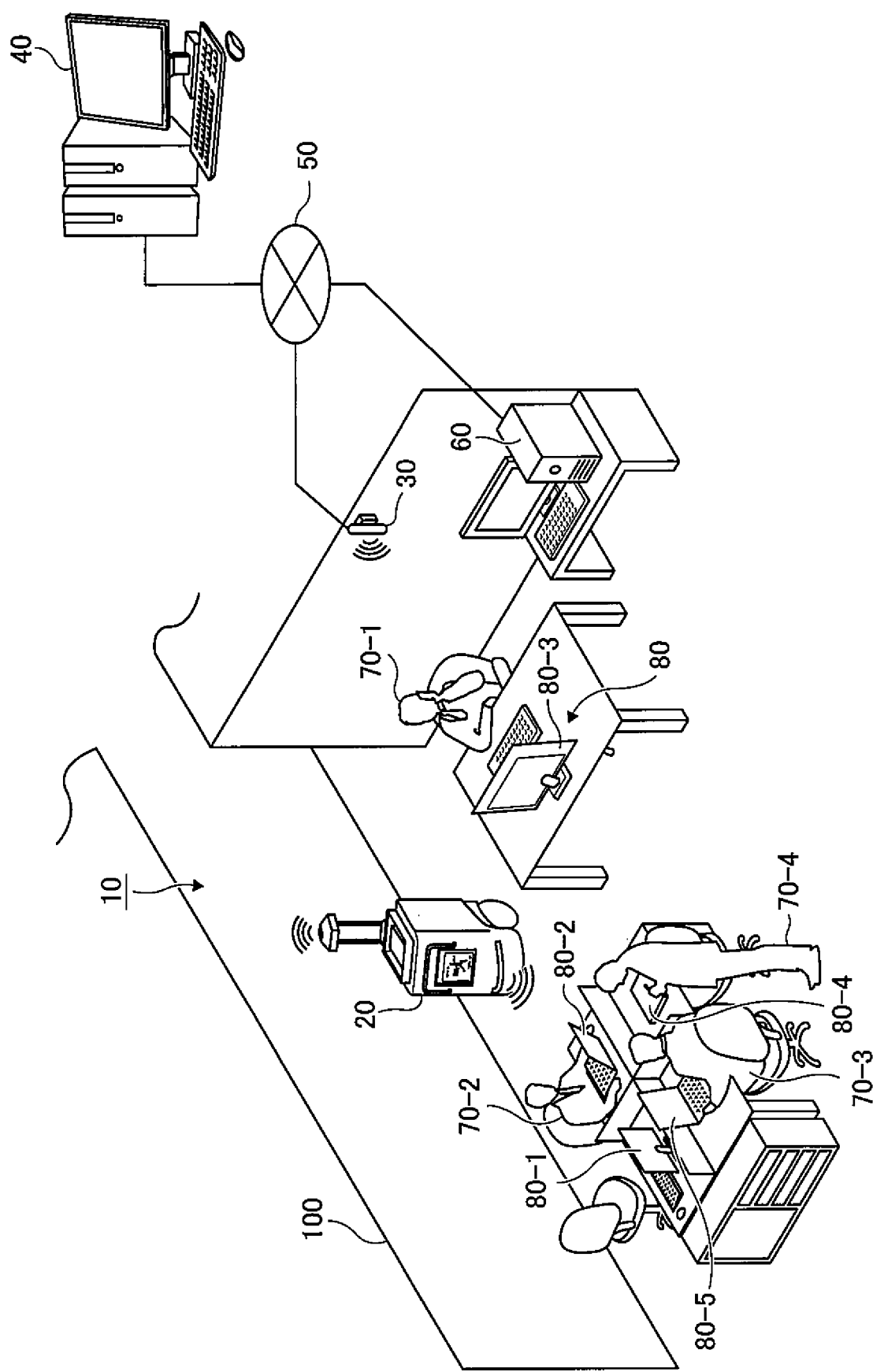
FIG. 1 illustrates an example of an information providing system according to the exemplary embodiment of the invention.

An information providing system 10 according to an exemplary embodiment will be described below with reference to FIG. 1. The information providing system 10 includes a self-mobile information providing apparatus 20, an advertising server 40, a management server 60, computers 80-1 through 80-5 (hereinafter simply called a "computer 80" or "computers 80") used by users 70-1 through 70-3 (hereinafter simply called a "user 70" or "users 70"). The above-described elements are placed in a relatively large area (hereinafter called a "workplace 101"), such as an office building floor. The self-mobile information providing apparatus 20 and the computers 80 are connected to the management server 60 via a network 50 or an access point 30 installed on a wall or a ceiling. The management server 60 is connected to the advertising server 40 via the network 50 (the Internet).

Figure 2:
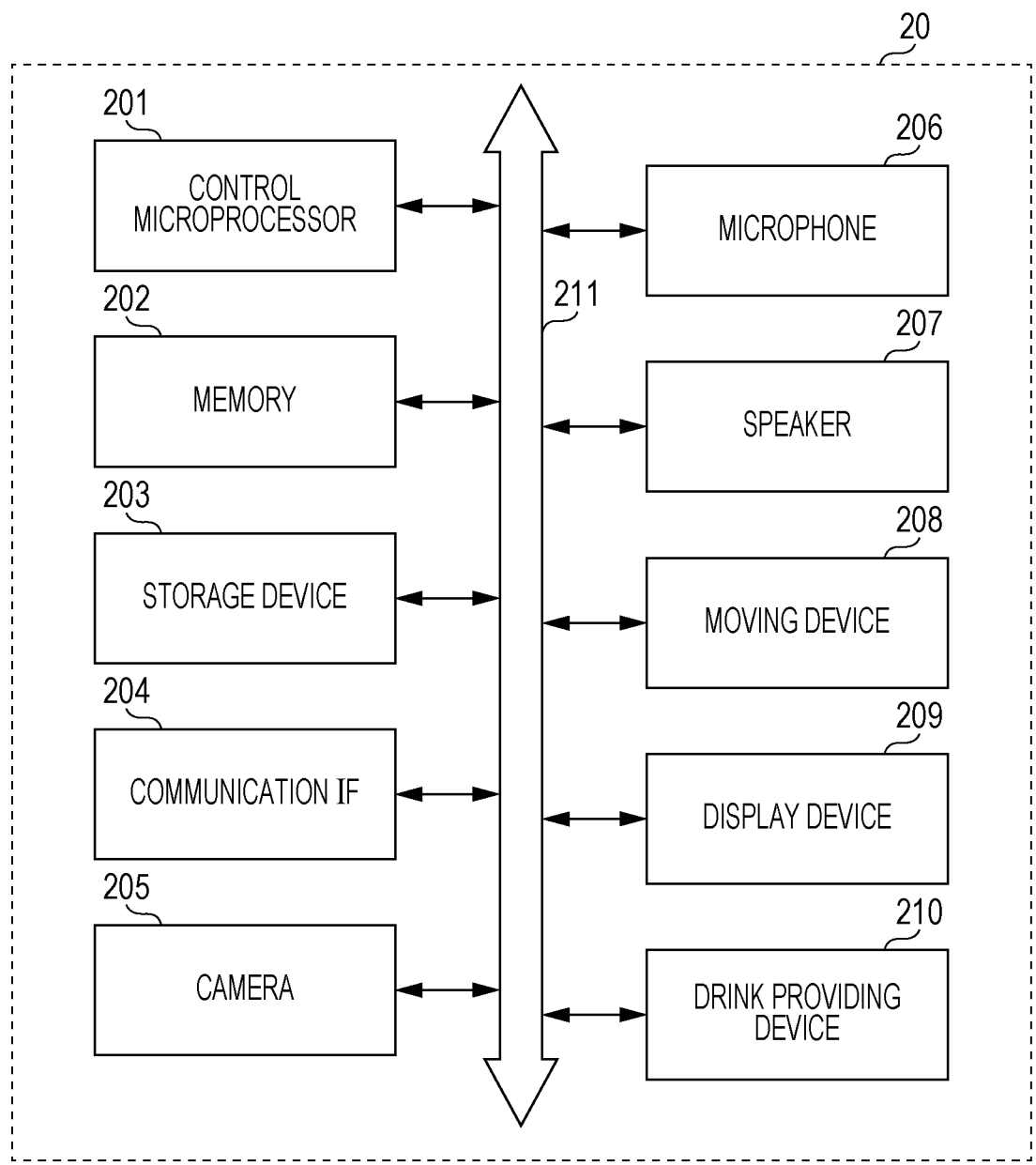
FIG. 2 is a block diagram of the hardware configuration of a self-mobile information providing apparatus according to the exemplary embodiment.

The self-mobile information providing apparatus 20 will be described below with reference to FIGS. 2 and 3. FIG. 2 is a block diagram of the hardware configuration of the self-mobile information providing apparatus 20. The self-mobile information providing apparatus 20 is a self-mobile service providing robot, such as a self-mobile vending machine or a self-mobile printer. The self-mobile vending machine provides drinks, such as tea and coffee, in response to a request from a user 70. The self-mobile printer performs printing of a document in response to a request from a user 70. A description will be given below, assuming that the self-mobile information providing apparatus 20 is a self-mobile vending machine that provides drinks to the users 70.

As shown in FIG. 2, the self-mobile information providing apparatus 20 includes a control microprocessor 201, a memory 202, a storage device 203, such as a hard disk drive (HDD) or a solid state drive (SSD), a communication interface 204, a camera 205, a microphone 206, a speaker 207, a moving device 208, a display device 209, and a drink providing device 210. These elements are connected to a control bus 211.

The control microprocessor 201 centrally controls operations of the individual elements of the self-mobile information providing apparatus 20, based on a control program stored in the storage device 203. The memory 202 temporarily stores images captured by the camera 205, voice data recorded by the microphone 206, information concerning a current position detected by a current position detector of the moving device 208, and information concerning a request to provide a drink from a user 70, for example. The storage device 203 stores the control program for controlling the individual elements of the self-mobile information providing apparatus 20. The communication interface 204 performs communication control for allowing the self-mobile information providing apparatus 20 to communicate with the management server 60 via the access point 30.

The camera 205 captures images of the workplace 100 and images of faces and behavior of the users 70, and stores the captured images in the memory 202. The microphone 206 detects the voice of the users 70 and stores (records) it in the memory 202. Instead of directly storing the voice of the users 70, the voice of the users 70 may be interpreted first and the content of a dialog may be stored in the memory 202. The speaker 207 outputs voice generated by an information presenter, which will be discussed later, of the self-mobile information providing apparatus 20. The moving device 208 includes a tire, a motor, a direction controller, and a current position detector (neither of them are shown). The moving device 208 causes the self-mobile information providing apparatus 20 to move to a specified destination or along a predetermined route, based on moving control information generated by a moving controller, which will be discussed later. The display device 209 is constituted by a liquid crystal display provided on a side or top surface of a housing of the self-mobile information providing apparatus 20. The display device 209 displays images and video provided by the information presenter, which will be discussed later. The drink providing device 210 includes a drink storage, a drink distributor, a drink container (a cup, for example) provider, and a warmer-and-cooler (neither of them are shown).

Figure 3:
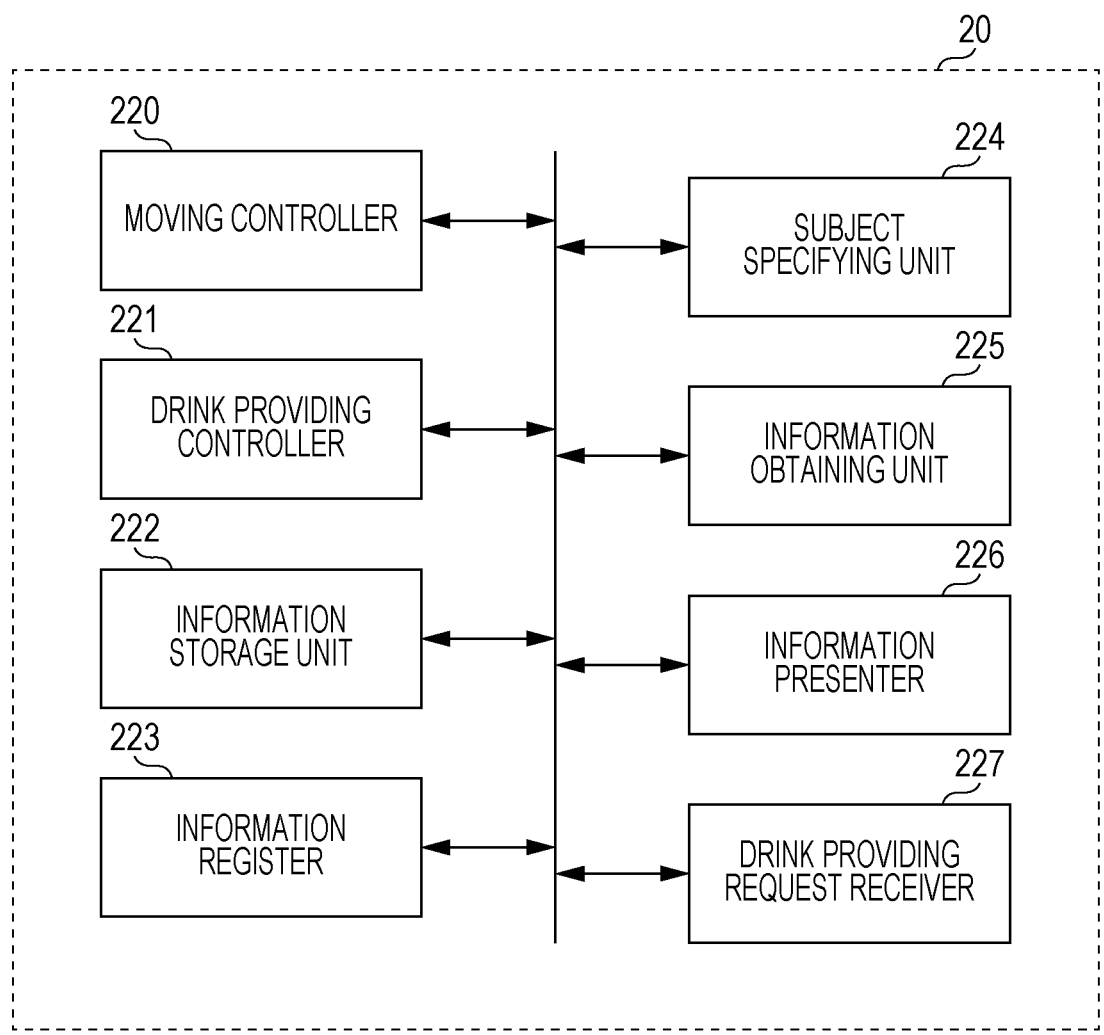
FIG. 3 is a functional block diagram of the self-mobile information providing apparatus according to the exemplary embodiment.

FIG. 3 is a functional block diagram of the self-mobile information providing apparatus 20. As a result of the control microprocessor 201 executing the control program stored in the storage device 203, the self-mobile information providing apparatus 20 functions as a moving controller 220, a drink providing controller 221, an information storage unit 222, an information register 223, a subject specifying unit 224, an information obtaining unit 225, an information presenter 226, and a drink providing request receiver 227, as shown in FIG. 3.

The moving controller 220 controls the moving device 208 so that the self-mobile information providing apparatus 20 will move around within the workplace 100 along a predetermined route if there is no request to provide a drink from any user 70. More specifically, the moving controller 220 obtains route information stored in the storage device 203 and compares a current position detected by the current position detector with a predetermined route indicated by the route information. The moving controller 220 then controls the motor and the direction controller of the moving device 208 and causes them to move the self-mobile information providing apparatus 20. Alternatively, the moving controller 220 may control the moving device 208 so that the self-mobile information providing apparatus 20 will wait at a predetermined position within the workplace 100 if there is no request to provide a drink from any user 70, and in response to a request from a user 70, the self-mobile information providing apparatus 20 will move to the user 70 as a destination and stop at this destination. The moving controller 220 may also control the moving device 208 so that the self-mobile information providing apparatus 20 will return to the predetermined position after it has finished providing a drink to the user 70.

The moving controller 220 may alternatively control the moving device 208 in the following manner by combining the above-described control approaches. The moving controller 220 controls the moving device 208 so that the self-mobile information providing apparatus 20 will move along the predetermined route within the workplace 100 if there is no request to provide a drink from any user 70, and in response to a request from a user 70, the self-mobile information providing apparatus 20 will separate from the predetermined route and move to the user 70. The moving controller 220 may also control the moving device 208 so that the self-mobile information providing apparatus 20 will return to the predetermined route and restart moving around within the workplace 100 after it has finished providing a drink.

The drink providing controller 221 performs control so that the drink providing device 210 will provide a drink to a user 70. More specifically, the drink providing controller 221 causes the warmer-and-cooler of the drink providing device 210 to keep drinks within the drink storage at a predetermined temperature. When the self-mobile information providing apparatus 20 moves to a user 70 in response to a request to provide a drink and stops at this user 70, the drink providing controller 221 causes the drink providing device 210 to take a container from the drink container provider, to pour a drink ordered by the user 70 from the drink storage into the container, and to provide the drink to the user 70.

The information storage unit 222 stores first information and second information. The first information is information associated with users (individuals or groups). The first information includes internal information, such as company newsletters for specific departments or specific targets and schedules associated with specific individuals (users 70). The internal information is registered by the information register 223, which will be discussed later. More specifically, information intended for a specific user 70 or intended target information, such as "for men", "for women", "for newcomers", "for development", and "for planning", is appended to the first information. The first information is stored in the information storage unit 222 in association with specific users.

The second information is information that is not associated with any user. The second information includes information for unspecified people, such as advertisements provided by the advertising server 40. In the following exemplary embodiment, a description will be given, assuming that the first information is internal information, such as a company newsletter or a schedule, and the second information is general advertisements. In the present invention, however, the first information and the second information are not restricted to these examples. The first information may include an advertisement or news that is associated with a user, and the second information may include general information for all members of a company that is not associated with any specific user.

The first information and the second information are stored in the information storage unit 222 in the form of an image file, a document file of a portable document format (PDF), a document file created by presentation software, or a video file. The first information and the second information may alternatively be stored in the information storage unit 222 in a webpage uniform resource locator (URL) format. The information storage unit 222 also stores a plan of the workplace 100, in particular, the seating arrangement of the users 70 and the seating arrangement of the departments within the workplace 100, and information for specifying individual users, such as face images of the users 70.

The information storage unit 222 also stores settings information. The settings information includes information indicating how often (frequency) or how long (duration) each of the first information and the second information is presented or the ratio of the first information to the second information in terms of the presentation frequency or the presentation duration. The settings information also includes information indicating which item of information will be presented among items of first information and items of second information stored in the information storage unit 222. The presentation frequency or the presentation duration may be set in the form of the ratio of internal information to advertisements instead of the first information to the second information. These settings indicated by the settings information are set by the advertising server 40, the management server 60, and the computers 80 used by the users 70.

The information register 223 stores and registers the first information and the second information provided by the advertising server 40, the management server 60, and the computers 80 used by the users 70 in the information storage unit 222. The information register 223 appends the above-described intended target information to the first information and registers the first information in the information storage unit 222 in association with users.

The subject specifying unit 224 specifies a user 70 located around the self-mobile information providing apparatus 20 in a dynamic manner in accordance with the movement of the self-mobile information providing apparatus 20. More specifically, the subject specifying unit 224 specifies a user 70 around the current position of the self-mobile information providing apparatus 20 indicated by the current position information obtained by the moving device 208. To put it more specifically, the subject specifying unit 224 compares the current position detected by the current position detector of the moving device 208 with the plan of the workplace 100 stored in the information storage unit 222, and then specifies a user 70 located around the current position. In this case, the user 70 is specified as an individual or a group (a department located in an area within which the current position is included). Alternatively, the subject specifying unit 224 may specify a specific user 70 by comparing an image of the user 70 captured by the camera 205 of the self-mobile information providing apparatus 20 with information concerning the users 70 stored in the information storage unit 222. The subject specifying unit 224 may specify a user 70 around the current position as an individual or as a group, such as a development department or a planning department. If the subject specifying unit 224 specifies a user 70 as a group, it may specify a user 70 as a department to which the user 70 belongs, such as a development department or a planning department, or the type of user 70, such as a man, a woman, or a newcomer.

The information obtaining unit 225 obtains information associated with a user 70 located around the current position of the self-mobile information providing apparatus 20 in accordance with the movement of the moving device 208. More specifically, the information obtaining unit 225 obtains information associated with a user 70 specified by the subject specifying unit 224. When obtaining information, the information obtaining unit 225 refers to the settings information stored in the information storage unit 222 so as to identify which type of information will subsequently be obtained, and then obtains this information and outputs it to the information presenter 226. The information obtaining unit 225 may obtain, as well as the first information associated with the user 70, the second information that is not associated with the user 70 located around the current position or a user 70 made a request to provide a drink service, based on the above-described settings information. The information obtaining unit 225 may alternatively exclude the second information that is not associated with the user 70, and obtain only the first information associated with the user 70. If necessary, the information obtaining unit 225 may obtain the first information including internal information, such as a schedule associated with a specific user 70 or a specific department, from the management server 60. In response to a request to provide a drink service from a user 70, the information obtaining unit 225 may obtain the first information associated with this user 70.

The information presenter 226 presents information obtained by the information obtaining unit 225 from the information storage unit 222. That is, the information presenter 226 displays or plays back the obtained information to a user 70 by using the display device 209 or the speaker 207. If the information obtaining unit 225 obtains only the first information, the information presenter 226 presents only the first information. If the information obtaining unit 225 obtains both of the first information and the second information (obtains at the same time or different times), the information presenter 226 presents the first information and the second information in a mixed manner. That is, instead of repeatedly displaying or playing back only the first information or only the second information, the information presenter 226 displays or plays back the first information for a predetermined time and then displays or plays back the second information for a predetermined time, based on the settings information stored in the information storage unit 222. The information presenter 226 may display the first information and the second information on the screen of the display device 209 at the same time. In this exemplary embodiment, however, the first information and the second information are displayed separately at different times.

The information presenter 226 may present the first information and the second information at a predetermined ratio in terms of the presentation frequency or the presentation duration, such as 3:1, based on the settings information stored in the information storage unit 222. For example, presenting of the first information and the second information at a predetermined frequency ratio of 3:1 means that while or after presenting three company newsletters indicated by the first information, one advertisement indicated by the second information is presented. Presenting of the first information and the second information at a predetermined duration ratio of 3:1 means that while or after displaying or playing back a company newsletter indicated by the first information for 45 seconds, an advertisement indicated by the second information is displayed or played back for 15 seconds.

The information presenter 226 may adjust the manner in which information is presented in accordance with the operation of the moving device 208. For example, the information presenter 226 may display or play back the second information when the moving device 208 is moving and display or play back the first information when the moving device 208 is at a standstill. The information presenter 226 may display or play back the second information when the self-mobile information providing apparatus 20 is moving toward a user 70 in response to a request to provide a drink service from this user 70, and may display or play back the first information associated with this user 70 when the self-mobile information providing apparatus 20 reaches the user 70. The information presenter 226 may alternatively display or play back the first information associated with the user 70 when the self-mobile information providing apparatus 20 reaches a position separated from the user 70 by a predetermined distance.

The drink providing request receiver 227 receives a request to provide a drink service from a user 70. That is, the drink providing request receiver 227 determines whether a request to provide a drink service has been made from a user 70. If the drink providing request receiver 227 receives a request from a user 70, it provides position information concerning the position of this user 70 to the moving controller 220 and also provides information concerning a drink ordered by the user 70 to the drink providing controller 221.

The advertising server 40 of this exemplary embodiment is managed by the system provider of the information providing system 10 of this exemplary embodiment. If the self-mobile information providing apparatus 20 is a self-mobile vending machine, the advertising server 40 is a server run by a beverage providing company which leases this self-mobile vending machine to a system administrator based on a measured-rate billing plan or a flat-rate billing plan. The advertising server 40 distributes beverage-related advertisements and other advertisements to the self-mobile information providing apparatus 20.

The system provider of the information providing system 10 starts advertisement creating application software by using the advertising server 40 and operates a user interface to create or edit various advertisements. Advertisements are created or edited in the form of an image file, a PDF document file, a document file created by presentation software, or a video file, and are stored in an advertisement storage unit (not shown) of the advertising server 40.

Advertisements are stored as the second information that is not associated with any user 70. However, an individual advertisement may be appended with a tag, such as "for men" or "for women", and may be stored in the advertisement storage unit as the first information associated with specific users 70.

The system provider sends selected items of information among items of first information and items of second information, such as advertisements stored in the advertisement storage unit, to the self-mobile information providing apparatus 20 and registers them therein. The system provider then accesses the self-mobile information providing apparatus 20 by using the advertising server 40, selects items of information to be provided to a user 70 among the items of first information and the items of second information which are registered in the self-mobile information providing apparatus 20 from the advertising server 40, and stores the selecting results in the information storage unit 222 of the self-mobile information providing apparatus 20 as settings information. More specifically, the system provider determines whether to provide an individual item of information stored in the self-mobile information providing apparatus 20 to a user 70 or sets at which frequency ratio or at which duration ratio a registered item of information will be presented, and stores the selecting or setting results in the information storage unit 222 as the settings information.

The management server 60 of this exemplary embodiment will be described below with reference to FIGS. 4 and 5. The management server 60 is managed by the system administrator of the information providing system 10 of this exemplary embodiment. If the self-mobile information providing apparatus 20 is a self-mobile vending machine, the management server 60 is installed in a company or an office, such as a sales office, which leases this self-mobile vending machine from a beverage providing company, which is the system provider of the information providing system 10. The management server 60 creates or edits internal information, such as company newsletters and schedules, and registers it in the self-mobile information providing apparatus 20, which is a self-mobile vending machine.

Figure 4:
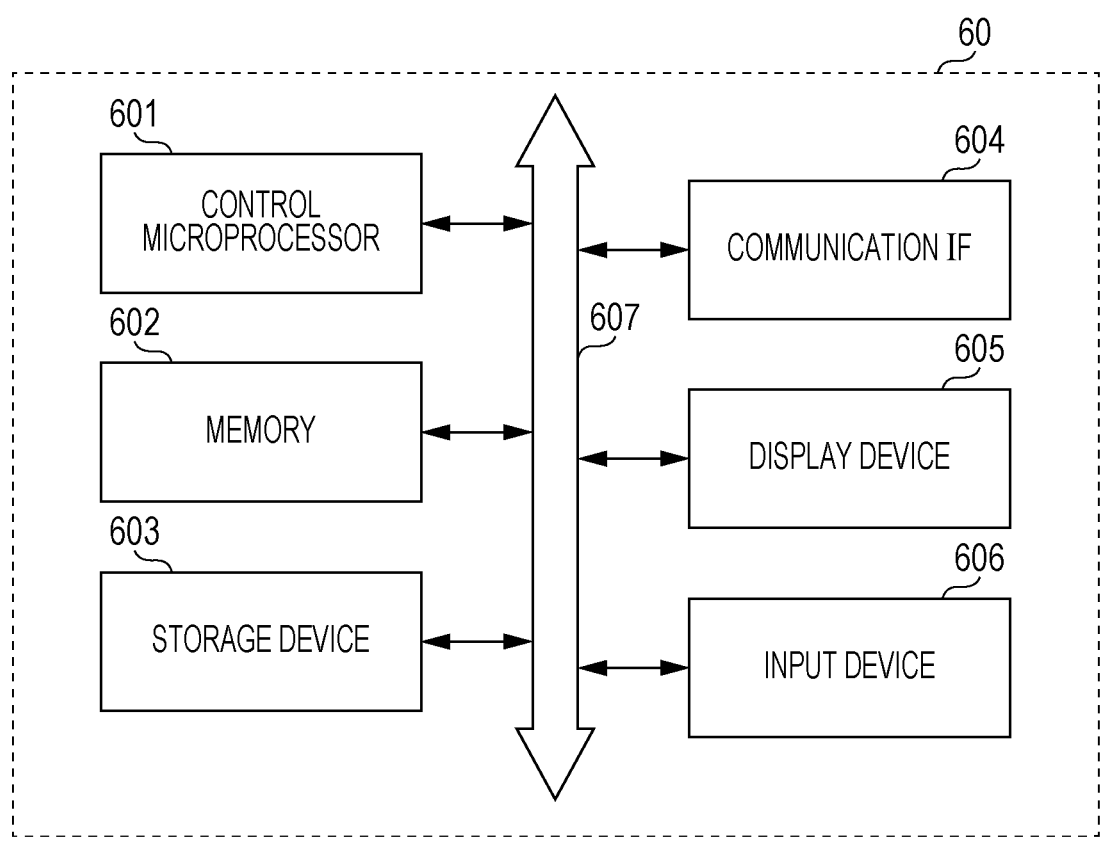
FIG. 4 is a block diagram of the hardware configuration of a management server according to the exemplary embodiment.

FIG. 4 is a block diagram of the hardware configuration of the management server 60. As shown in FIG. 4, the management server 60 includes a control microprocessor 601, a memory 602, a storage device 603, a communication interface 604, a display device 605, and an input device 606. These elements are connected to a control bus 607.

The control microprocessor 601 centrally controls operations of the individual elements of the management server 60, based on a control program stored in the storage device 603. The memory 602 temporarily stores internal information created or being edited by an internal-information creator-and-editor, which will be discussed later.

The storage device 603 is an HDD or an SSD, and stores the control program for controlling the management server 60. The storage device 603 also includes an internal information storage which stores internal information, such as company newsletters and personal or department schedules. The internal information storage will be discussed later.

The communication interface 604 performs communication control for allowing the management server 60 to send and receive various items of data to and from the advertising server 40 via the network 50 (the Internet) and to send and receive various items of data to and from the self-mobile information providing apparatus 20 and the computers 80 used by the users 70 via the access point 30.

The display device 605 is constituted by a liquid crystal display, a plasma display, or an organic electroluminescent display, for example, and displays internal information, such as company newsletters and personal or department schedules, created or edited by the internal-information creator-and-editor, which will be discussed later. The input device 606 includes a keyboard and a mouse, for example, and is operated by a user 70 for creating or editing internal information, such as company newsletters and personal or department schedules, by using the internal-information creator-and-editor, which will be discussed later.

Figure 5:
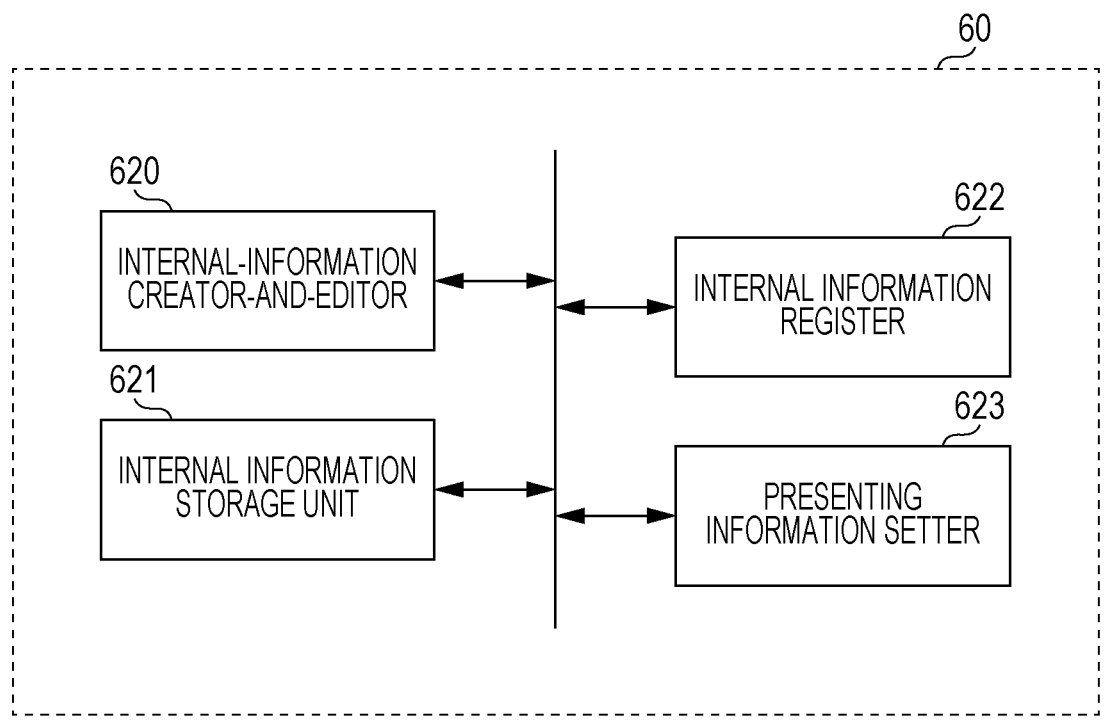
FIG. 5 is a functional block diagram of the management server according to the exemplary embodiment.

FIG. 5 is a functional block diagram of the management server 60. As a result of the control microprocessor 601 executing the control program stored in the storage device 603, the self-mobile information providing apparatus 20 functions as an internal-information creator-and-editor 620, an internal information storage unit 621, an internal information register 622, and a presenting information setter 623.

The internal-information creator-and-editor 620 is used by the system administrator of the information providing system 10 to create or edit internal information, such as a company newsletter, by using the input device 606. Internal information is created or edited in the form of an image file, a PDF document file, a data file, such as a personal or department schedule, created by personal information management application software, a document file created by presentation software, or a video file, and is stored in the internal information storage unit 621, which will be discussed below.

The internal information storage unit 621 stores various items of internal information created or edited by the internal-information creator-and-editor 620 in various file formats. Each item of internal information is stored in the internal information storage unit 621 as the first information associated with a user 70. More specifically, each item of internal information is appended with intended target information, such as "for men", "for women", "for newcomers", "for development", and "for planning", so as to be associated with a user 70. Each item of internal information may be appended with only one item of intended target information or with plural items of intended target information. Some items of internal information may be stored in the internal information storage unit 621 as the second information that is not associated with any user 70.

The internal information storage unit 621 also stores personal or department schedules created by the above-described personal information management application software. The personal or department schedules synchronize with personal or department schedules stored in a personal information storage unit (not shown) of a computer 80. In the personal or department schedules, schedules are stored by individuals or departments, and settings information is also stored. The settings information indicates which items of information in each schedule will be provided or will not be provided, and if a certain item of information is provided, to which user or department it will be provided (provision range) and how often (frequency) or how long (duration) it will be provided.

The system administrator operates the input device 606 to select internal information among items of first information and items of second information stored in the internal information storage unit 621. The internal information register 622 sends such internal information to the self-mobile information providing apparatus 20 and registers the internal information therein.

The presenting information setter 623 accesses the self-mobile information providing apparatus 20, selects items of information to be provided to a user 70 among items of first information and items of second information which are registered in the self-mobile information providing apparatus 20 from the management server 60, and stores the selecting results in the information storage unit 222 of the self-mobile information providing apparatus 20 as settings information. More specifically, the presenting information setter 623 determines whether to provide an individual item of information registered in the self-mobile information providing apparatus 20 to a user 70 or sets at which frequency ratio or at which duration ratio a registered item of information will be presented, and stores the selecting or setting results in the information storage unit 222 as the settings information.

Personal information management application software is installed within a computer 80 used by a user 70 in the workplace 100 for business use. In a storage unit (not shown) of the computer 80, personal or department schedules created or edited by the personal information management application software are stored. The personal or department schedules synchronize with the personal or department schedules stored in the internal information storage unit 621 of the management server 60. The user 70 starts the personal information management application software by using the computer 80 to create or edit a personal or department schedule by using the input device (not shown), and then stores it as the first information in association with a specific individual or a specific department.

The user 70 selects and sets which items of information will be provided among the stored personal or department schedules by using the computer 80. More specifically, the user 70 selects and sets which items of information will be provided or will not be provided, and if a certain item of information is provided, to which user or department it will be provided (provision range) and at which frequency ratio or at which duration ratio it will be provided. The user 70 may access the self-mobile information providing apparatus 20 by using the computer 80, select items of information to be provided to a user 70 or a department among items of first information and items of second information which are registered in the self-mobile information providing apparatus 20 from the management server 60 and the computer 80, and store the selecting results in the information storage unit 222 of the self-mobile information providing apparatus 20 as settings information. In this case, the user 70 determines whether to provide an individual item of information stored in the self-mobile information providing apparatus 20 or sets at which frequency ratio or at which duration ratio a registered item of information will be provided, and stores the selecting or setting results in the information storage unit 222 as the settings information.

As a result of the user 70 operating the computer 80, the computer 80 displays a list of drinks provided by the self-mobile information providing apparatus 20 on a display of the computer 80. When the user 70 selects a drink from the list, the computer 80 sends a request to provide a drink to the self-mobile information providing apparatus 20 via an interface (not shown). The request includes information concerning the user 70 and the type of drink ordered by the user 70.

Figure 6:
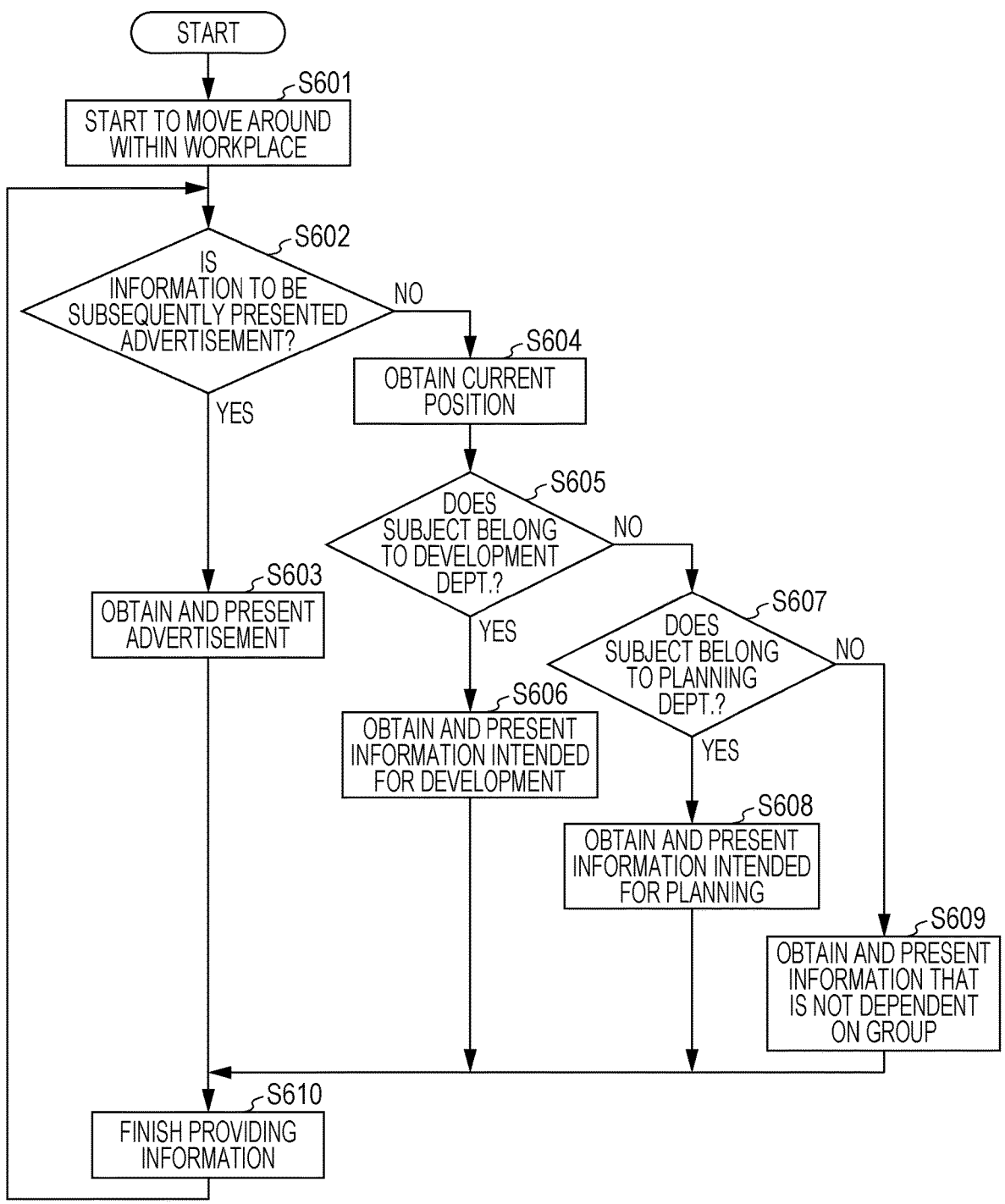
FIG. 6 is a flowchart illustrating an example of information providing processing executed by the information providing system according to the exemplary embodiment.

An example of information providing processing executed by the information providing system 10 according to this exemplary embodiment will be described below with reference to the flowchart of FIG. 6. In the example shown in FIG. 6, the self-mobile information providing apparatus 20 presents information, such as advertisements and internal information, while moving around within the workplace 100.

If there is no request to provide a drink from any user 70, in step S601, by comparing the current position of the self-mobile information providing apparatus 20 detected by the current position detector of the moving device 208 with a predetermined route stored in the storage device 203, the moving controller 220 controls the moving device 208 so that the self-mobile information providing apparatus 20 will move around within the workplace 100 along the predetermined route. Then, in step S602, the information obtaining unit 225 refers to the settings information stored in the information storage unit 222 and compares the settings information with information which is being presented by the information presenter 226, and then determines whether information to be subsequently obtained and presented to users 70 is an advertisement.

If it is found in step S602 that information to be subsequently obtained and presented is an advertisement, the process proceeds to step S603. In step S603, the information obtaining unit 225 obtains the advertisement stored in the information storage unit 222, and the information presenter 226 displays or plays back the advertisement to the users 70 by using the display device 209 or the speaker 207. The process then proceeds to step S610.

If it is found in step S602 that information to be subsequently obtained and presented is not an advertisement, the process proceeds to step S604. In step S604, the information obtaining unit 225 obtains the current position detected by the current position detector of the moving device 208. Then, in step S605, the subject specifying unit 224 compares the current position with the plan of the workplace 100 stored in the information storage unit 222, and determines whether users 70 around the current position belong to the development department. This determination is made based on whether the current position is located within the area of the development department.

If it is found in step S605 that the users 70 around the current position belong to the development department, the process proceeds to step S606. In step S606, the information obtaining unit 225 obtains internal information appended with intended target information "for development" among items of first information stored in the information storage unit 222, and the information presenter 226 displays or plays back the obtained information for the users 70 by using the display device 209 or the speaker 207. The process then proceeds to step S610.

The state of the self-mobile information providing apparatus 20 in step S606 is illustrated in (A) of FIG. 7. The self-mobile information providing apparatus 20 is passing by the development department within the workplace 100, and internal information intended for the development department "Mr. Yamada has developed a new robot" is being displayed on the display device 209 of the self-mobile information providing apparatus 20.

If it is found in step S605 that the users 70 around the current position do not belong to the development department, the process proceeds to step S607. In step S607, the subject specifying unit 224 determines whether the users 70 around the current position belong to the planning department, based on whether the current position is located within the area of the planning department. If it is found in step S607 that the users 70 around the current position belong to the planning department, the process proceeds to step S608. In step S608, the information obtaining unit 225 obtains internal information appended with intended target information "for planning" among items of first information stored in the information storage unit 222, and the information presenter 226 displays or plays back the obtained information for the users 70 by using the display device 209 or the speaker 207. The process then proceeds to step S610.

The state of the self-mobile information providing apparatus 20 in step S608 is illustrated in (B) of FIG. 7. The self-mobile information providing apparatus 20 is passing by the planning department within the workplace 100, and internal information intended for the planning department "for members in planning dept.: a planning meeting will start at 10 a.m. tomorrow" is being displayed on the display device 209 of the self-mobile information providing apparatus 20.

If it is found in step S607 that the users 70 around the current position do not belong to the planning department, the process proceeds to step S609. In step S609, the subject specifying unit 224 determines that the subject located around the current position is a member who does not belong to any particular group. The information obtaining unit 225 then obtains general information that is not associated with any specific user 70, such as a company newsletter, among items of information stored in the information storage unit 222. The information presenter 226 then displays or plays back the obtained information for the subject by using the display device 209 or the speaker 207. The process then proceeds to step S610.

In step S610, the information presenter 226 finishes presenting information to the users 70 because the predetermined duration time set by the settings information stored in the information storage unit 222 has elapsed. Then, the process returns to step S601, and the moving controller 220 controls the moving device 208 so that the self-mobile information providing apparatus 20 will restart moving around within the workplace 100 along the predetermined route and at the same time present the first information or the second information.

In the above-described example, the department of the users 70 located around the current position is determined based on the current position detected by the current position detector of the moving device 208. Alternatively, the subject specifying unit 224 may analyze an image of the users 70 captured by the camera 205 and determine the types (gender, for example) of users 70. More specifically, the subject specifying unit 224 may specify the users 70 based on the features of the image, such as whether the users 70 are constituted by more men than women or more women than men. If most of the users 70 are found to be men, the information obtaining unit 225 obtains internal information appended with intended target information "for men" among items of first information stored in the information storage unit 222, and the information presenter 226 presents the obtained internal information to the users 70. If most of the users 70 are found to be women, the information obtaining unit 225 obtains internal information appended with intended target information "for women", and the information presenter 226 presents the obtained internal information to the users 70.

In the above-described example, the self-mobile information providing apparatus 20 moves around within the workplace 100 while presenting the second information, such as advertisements, and the first information associated with a particular department, such as a company newsletter, in a mixed manner. Alternatively, when passing by a department or a group, the self-mobile information providing apparatus 20 may present news or an advertisement (first information) associated with this department or group.

Another example of the information providing processing executed by the information providing system 10 according to this exemplary embodiment will be described below with reference to the flowchart of FIG. 8. In the example shown in FIG. 8, if there is no request to provide a drink from any user 70, the self-mobile information providing apparatus 20 waits at a predetermined position (home position). In response to a request to provide a drink from a user 70, the self-mobile information providing apparatus 20 starts to move toward this user 70 as a destination and presents the second information, such as an advertisement while moving. When the self-mobile information providing apparatus 20 reaches the user 70, it presents the first information associated with the user 70, such as a schedule of this user 70. After finishing providing a drink, the self-mobile information providing apparatus 20 starts to move and again presents the second information, such as an advertisement, while returning to the predetermined position (home position).

In step S801 of FIG. 8, the self-mobile information providing apparatus 20 waits at a predetermined position (home position) within the workplace 100. In step S802, the drink providing request receiver 227 of the self-mobile information providing apparatus 20 determines whether a user 70 within the workplace 100 has made a request to provide a drink by using the computer 80, that is, whether the drink providing request receiver 227 has received an order from a user 70.

The user 70 can order a drink in the following manner. The user 70 operates drink order application software installed in the computer 80 of the user 70 or opens a drink order webpage by using an Internet browser, displays a list of drinks, and selects a drink by operating the input device (not shown). The computer 80 then sends a request including information concerning the user 70, the position of the user 70, and the type of drink ordered by the user 70 to the self-mobile information providing apparatus 20 via the access point 30. Upon receiving this request, the drink providing request receiver 227 determines that it has received an order from a user 70. A user 70 may order a drink by beckoning instead of operating the computer 80. In this case, if an image or video captured by the camera 205 of the self-mobile information providing apparatus 20 shows that a user 70 is beckoning, the drink providing request receiver 227 determines that the user 70 has made a request to provide a drink.

If it is found in step S802 that there is no request to provide a drink from any user 70, the process returns to step S801, and the self-mobile information providing apparatus 20 continues to wait at the predetermined position. If it is found in step S802 that a user 70 has made a request to provide a drink, the process proceeds to step S803. In step S803, the moving controller 220 controls the moving device 208, based on the position information concerning the position of the user 70 included in the request from the user 70, so that the self-mobile information providing apparatus 20 will start to move to the user 70.

In step S804, the information obtaining unit 225 of the self-mobile information providing apparatus 20 accesses the management server 60, obtains information concerning a personal or department schedule associated with this user 70 among items of information stored in the internal information storage unit 621 of the management server 60, and temporarily stores the obtained information in the information storage unit 222 as the first information.

In step S805, the information obtaining unit 225 obtains the second information that is not associated with any user 70, such as a general advertisement, among items of information stored in the information storage unit 222, and the information presenter 226 presents (displays or plays back) the second information by using the display device 209 or the speaker 207.

The state of the self-mobile information providing apparatus 20 in step S805 is illustrated in (A) of FIG. 9. While the self-mobile information providing apparatus 20 is moving toward the user 70, information that is not dependent on any user, that is, information that is not associated with any user 70, such as an advertisement "we have started providing iced coffee" or "today, café au lait is half price", is displayed on the display device 209.

In step S806, the moving controller 220 compares the current position detected by the current position detector of the moving device 208 with the position of the user 70, and determines whether the self-mobile information providing apparatus 20 has reached the user 70. If the self-mobile information providing apparatus 20 has not yet reached the user 70, the process returns to step S805. The moving controller 220 controls the moving device 208 so that the self-mobile information providing apparatus 20 continues to display the second information, such as a general advertisement. When displaying the second information, different items of second information may be displayed in turns at predetermined regular intervals, based on the settings information stored in the information storage unit 222. If the duration for which each item of information is presented is determined by the settings information, when the presentation duration of a certain item of information has elapsed, the information obtaining unit 225 may obtain an item of information to be subsequently presented from the information storage unit 222, and the information presenter 226 may present this item of information by using the display device 209 or the speaker 207.

If it is found in step S806 that the self-mobile information providing apparatus 20 has reached the user 70, the process proceeds to step S807. In step S807, the moving controller 220 stops the moving device 208, and the drink providing controller 221 causes the drink providing device 210 to start to provide a drink to the user 70. More specifically, a container is provided from the drink container provider, and the drink distributor pours a predetermined amount of drink ordered by the user 70 from the drink storage into the container.

In step S808, the information presenter 226 finishes presenting the second information. Then, in step S809, the information obtaining unit 225 obtains information concerning a personal or department schedule of the user 70, which is the first information associated with this user 70 and is temporarily stored in the information storage unit 222, and the information presenter 226 presents this information to the user 70 by using the display device 209 or the speaker 207.

The state of the self-mobile information providing apparatus 20 in step S809 is illustrated in (B) of FIG. 9. The self-mobile information providing apparatus 20 stops at the user 70 to provide a drink, and information concerning a schedule associated with this user 70, for example, information "a group meeting will start at 3 p.m. today", is displayed on the display device 209.

In step S810, when the drink providing device 210 has finished providing a drink, that is, when the drink providing device 210 has finished pouring a drink, or when the user 70 has removed a container with drink from the self-mobile information providing apparatus 20, the information presenter 226 finishes presenting a personal or department schedule, which is the first information. The process then proceeds to step S811. Alternatively, even after the drink providing device 210 has finished pouring a drink or even after the user 70 has removed a container with drink from the self-mobile information providing apparatus 20, if the predetermined presentation duration for the first information has not yet elapsed, the information presenter 226 may continue to display the first information until the predetermined presentation duration elapses, and then, the process proceeds to step S811.

In step S811, the information obtaining unit 225 obtains the second information that is not associated with any specific user 70, such as a general advertisement, among items of information stored in the information storage unit 222, and the information presenter 226 presents the second information by using the display device 209 or the speaker 207.

In step S812, the moving controller 220 starts to control the moving device 208 so that the self-mobile information providing apparatus 20 will start to return to the predetermined position (home position), and the information presenter 226 continues to display the second information. After the self-mobile information providing apparatus 20 has returned to the predetermined position, the information presenter 226 finishes displaying the second information. The information providing system 10 completes the information providing processing. Alternatively, the process returns to step S801. The self-mobile information providing apparatus 20 restarts to wait at the predetermined position.

In the example shown in FIGS. 8 and 9, the self-mobile information providing apparatus 20 waits at the predetermined position, and starts to move toward a user 70 in response to a request to provide a drink from the user 70. Alternatively, the self-mobile information providing apparatus 20 may take the following approach. The self-mobile information providing apparatus 20 moves around within the workplace 100 along a predetermined route and at the same time presents the second information or the first information. In response to a request to provide a drink from a user 70, the self-mobile information providing apparatus 20 separates from the predetermined route and moves to the user 70. When providing a drink to the user 70, the self-mobile information providing apparatus 20 presents an item of information that is associated with this user 70, such as information concerning a personal schedule of the user 70, among items of first information. After finishing providing a drink and the information, the self-mobile information providing apparatus 20 returns to the predetermined route and continues to display the second information or the first information.

In the above-described example, when the self-mobile information providing apparatus 20 reaches a user 70 made a request, it automatically provides a drink and the first information associated with this user 70. Alternatively, the self-mobile information providing apparatus 20 may include an authenticating function for authenticating a user 70, such as an integrated circuit (IC) card reader, fingerprint authenticating, or face authenticating using a camera. When the user 70 is authenticated by using the authenticating function, the self-mobile information providing apparatus 20 may start providing a drink and the first information associated with the user 70.

In the above-described example, the self-mobile information providing apparatus 20 is a self-mobile vending machine that provides drinks, such as tea and coffee, in response to a request from a user 70. The self-mobile information providing apparatus 20 may be a self-mobile printer that performs printing of a document in response to a request from a user 70 or a self-mobile service providing robot that transports an object other than drinks.

In the above-described example, when moving toward a user 70 made a request, the self-mobile information providing apparatus 20 presents an advertisement as the second information. However, the self-mobile information providing apparatus 20 may present news as the second information. While moving toward a user 70 made a request, the self-mobile information providing apparatus 20 may recognize a department by which the self-mobile information providing apparatus 20 is passing on the way to the user 70 and present the first information associated with this department, such as a company newsletter or an advertisement.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information providing apparatus comprising:
   a moving unit that causes the information providing apparatus to move toward a specified destination or along a predetermined route;
   an obtaining unit that obtains information associated with a current position of the information providing apparatus in accordance with moving of the moving unit; and
   a presenting unit that presents the information obtained by the obtaining unit,
   wherein the obtaining unit also obtains non-associated information that is not associated with a user located around the current position, and the presenting unit presents the non-associated information together with the information associated with the current position in a mixed manner.

2. The information providing apparatus according to claim 1, further comprising:
   a specifying unit that specifies a user located around the current position, based on current position information concerning the current position of the information providing apparatus,
   wherein the obtaining unit obtains information associated with the user specified by the specifying unit.

3. The information providing apparatus according to claim 2, wherein the specifying unit specifies a user located around the current position as a group.

4. The information providing apparatus according to claim 1, further comprising:
   a receiving unit that receives a request to provide a service from a user,
   wherein, when the receiving unit receives a request to provide a service from a user, the moving unit causes the information providing apparatus to move to the user as a destination, the obtaining unit obtains information associated with the user, and the presenting unit presents the information associated with the user when the information providing apparatus reaches the destination.

5. The information providing apparatus according to claim 4, further comprising:
   an authenticating unit that authenticates the user,
   wherein, when the user is authenticated by the authenticating unit, the presenting unit presents the information associated with the user.

6. The information providing apparatus according to claim 1, wherein the non-associated information and the information associated with the user located around the current position are presented at a predetermined ratio in terms of presentation frequency or presentation duration.

7. An information providing system comprising:
   a moving device;
   a storage unit that stores various items of information in association with positions;
   a specifying unit that specifies a current position of the moving device in accordance with moving of the moving device;
   an obtaining unit that obtains information associated with the position specified by the specifying unit from the storage unit; and
   a presenting unit that presents the information obtained by the obtaining unit,
   wherein the obtaining unit also obtains non-associated information that is not associated with a user located around the current position, and the presenting unit presents the non-associated information together with the information associated with the current position in a mixed manner.

8. The information providing system according to claim 7, further comprising:
   a receiving unit that receives a request to provide a service from a user,
   wherein, when the receiving unit receives a request to provide a service from a user, the moving device moves to the user as a destination, the obtaining unit obtains information associated with the user, and the presenting unit presents the information associated with the user when the moving device reaches the destination.

* * * * *